March 19, 1974　　　C. O. BUNN　　　3,798,158
PROCESS FOR REMOVING OIL AND OTHER ORGANIC
CONTAMINANTS FROM WATER
Filed May 26, 1971　　　　　　　　　　　　2 Sheets-Sheet 1

FIG. 1

INVENTOR
CLINTON O. BUNN

BY Oberlin, Maky, Donnelly & Renner
ATTORNEYS

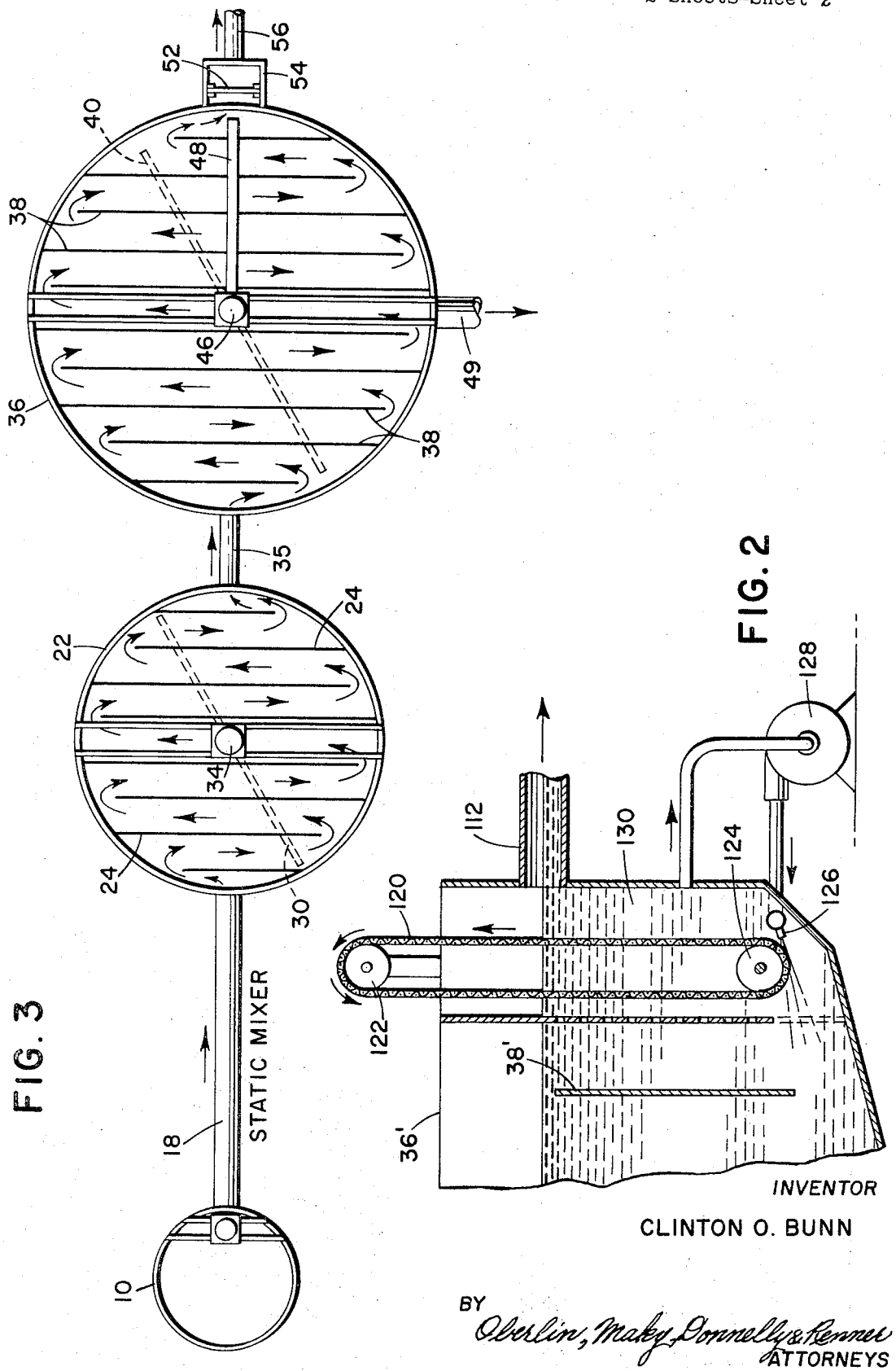

United States Patent Office 3,798,158
Patented Mar. 19, 1974

3,798,158
PROCESS FOR REMOVING OIL AND OTHER ORGANIC CONTAMINANTS FROM WATER
Clinton O. Bunn, Denver, Colo., assignor to Col-Mont Corporation, Butte, Mont.
Filed May 26, 1971, Ser. No. 146,985
Int. Cl. B01d *15/06;* C02b *1/14*
U.S. Cl. 210—33
12 Claims

ABSTRACT OF THE DISCLOSURE

Method of the removal of oil and other organic contaminants from polluted effluent, particularly oil refinery effluent. The oil is sorbed by carbonaceous material either in the form of −200 mesh or finer carbon particles in the form of coal, fly ash or activated carbon, or a porous matrix comprised of such finely divided carbon particles and a powdered plastic such as polyethylene, or a combination of powdered carbon particles and matrix. The sorbent is stripped of the oil thereby conditioning the same for reuse in the system, or withdrawal from the system, in the case of matrix formation, for use independent of the system.

BACKGROUND OF THE INVENTION

The present invention relates as indicated to a process for removing oil and other organic contaminates from water. More particularly, the invention relates to a process of and apparatus for treating the effluent from sewage treatment plants or oil refinery waste treatment facilities for removing from such effluent oil and oil by-products. The terms oil and oil by-products as used herein are intended broadly to include oil emulsions, dissolved oil by-products, oil present in a mixture of oil and water or other liquid effluent, or oil present in any form.

The pollution of rivers, lakes, streams and even oceans by oil-containing effluent from water treatment facilities of all types has long been a problem, with the increased concern over our environmental conditions only serving to focus more attention to this problem and to past and present efforts at solving the problem. The magnitude and frequency of recent oil spillages and leakage have served to further concentrate efforts to diminish or even alleviate the problem of oil pollution, with attention being directed to applicant's U.S. Pat. 3,536,615 and co-pending applications Ser. No. 51,541, filed July 1, 1970, now U.S. Pat. No. 3,651,948, and Ser. No. 121,000, filed Mar. 4, 1971, which are directed to processes, apparatus and compositions for handling oil leakages and spillage.

Although current efforts deal mainly with the oil leakage problem, which arises from off-shore drilling and production, leakage from tankers and the like transporting the oil, leakage in ports and harbors transferring the oil to inland storage facilities, to name only a few, it is recognized that the polluting of our inland waterways and lakes by oil-containing effluent has been and remains a more serious problem in terms of long term adverse environmental effects. The return of the oil-containing effluent from water purification and treatment facilities to streams and rivers eventually returns to a considerable degree to our drinking water and to water required for industrial purposes. To this problem is added the pollution caused by ground seepage of oil and oil products from inland facilities which likewise eventually pollute our subsurface water supplies.

The extent of this problem is perhaps best seen by the numerous and varied efforts which have been made to provide an effluent from our sewage and industrial waste treatment facilities which is substantially free of pollutants and thereby non-harmful when returned to our surface waterways. Included in these efforts are treatments of the effluent by carbon in the form of both coal and activated carbon and charcoal. The absorbent properties of carbon for both gases and liquids are well documented and various carbon materials and systems have been disclosed relating to this ever-increasing problem. By way of example, but by no means exhaustive, of the patents and publications which disclose the use of carbon in the treatment of oil-containing waste waters and sewage treatment effluents are U.S. Pats. 3,401,144; 3,516,930; and 3,424,676; an article entitled "Clarification-Adsorption in the Treatment of Municipal and Industrial Waste Water," Water Pollution Control Federation, vol. 42, May 1970, pp. 794–800; an article entitled "Use of Activated Carbon to Prevent Water Supply Contamination," Water and Wastes Engineering, vol. 6, February 1969, pp. 42–44; and an article entitled "Use of Coal and Fly Ash as Absorbents for Removing Organic Contaminates from Secondary Municipal Effluents," appearing in I&EC Process Design and Development, vol. 4, No. 3, July 1965, pp. 323–327. Attention is also directed to U.S. Pats. 3,217,715; 3,474,600 and 3,538,020 which relate to the use of bonded activated carbon particles for use as gas absorbents.

As noted, the removal of the emulsified oil and oil byproducts in solution from oil refinery effluents has posed a problem which has defied economic solution. Although activated carbon has provided superior results in the removal of oil from such effluents, the cost of activated carbon in the quantities required for commercial large scale operation are almost prohibitively high. An alternative treatment system in wide spread use today to treat oil-containing effluents is the use of bacteria which are aerobic in character and which break down and remove the oil from the effluent. However, this type of biological treatment has certain disadvantages, perhaps the principal one being the relatively long treatment time required for breakdown of the oil contaminates, which consequently affects the capacity of the treatment facility. In addition, environmental factors such as rainfall significantly affect the operation of the system causing unbalancing of the delicate correlation between the oil pollutant food supply and the bacteria. In addition, biological systems are limited to aerobic conditions, and are therefore not adaptable to secondary sewage treatment.

In short, there is great need for an efficient and economical system for treating and removing oil and organic contaminates from sewage and industrial waste effluents. With respest to oil refinery effluents, the best mechanical and oil skimming efforts now are deemed satisfactory if the amount of oil pollutants in the effluent is kept in the range of 15 p.p.m. to 30 p.p.m. prior to biological treatment. Although pollutants in this range would have been considered tolerable even a short time ago, current research is only now uncovering the potential harm which even this quantity of oil pollution can do to our rivers, streams and lakes. Once such pollutants get into these waterways, they are most difficult to remove by standard biochemical oxidation treatment and therefore tend to remain in the water supply for long periods of time and through continuous recycling. Experts are still not certain of the harmful effects of human consumption of these residual pollutants in our water supply, although indications are that human consumption of these chemical pollutants may have significant harmful effects over a period of time.

SUMMARY OF THE INVENTION

With the above in mind, a primary object of the present invention is to provide a method of treatment of sewage and industrial waste effluent which effects substantially complete removal of the oil contaminates.

A further, more specific object of the invention is to provide such a method wherein finely ground coal either in powder form or as part of a porous matrix, or a mixture of both, is provided in a treatment system for removing the oil contaminates. In accordance with the invention, the effluent is intimately mixed with the powdered coal or, in accordance with the preferred form of the invention, coal matrix, and these products in oil-enriched condition are transported to oil separation equipment in which the oil is separated from the coal or coal matrix and the latter recycled for reuse. In this manner, there is essentially no loss of sorbent material, thereby lending further economy to the system. The term "sorbent" and variations thereof as used herein is intended to comprehend both the terms "absodbent" and "absorbent," and their variations. Both of these characteristics reside in certain forms of the invention and the term "sorbent" is used to simplify the invention disclosure.

A further object of the present invention is to provide a method for treating oil polluted effluent in which the sorption time is greatly minimized thereby greatly increasing the capacity of the system with respect to the equipment employed. Testing has indicated that the sorption of the oil contaminates by the coal or coal matrix is completed upon effective contact as compared with the hours or even days of present treatment systems for removing oil contaminates. In this regard the amount and thus cost of equipment required is thus greatly reduced when compared with present equipment in the form of extensive lagoons, settling tanks and filter beds.

A still further object of the present invention is to provide a method in which the coal or coal matrix can be quickly and effectively regenerated thereby achieving significant economies as well as substantially reducing the problem of coping with the coal fines. In this regard, the treatment, particularly the filtering, in systems employing carbon fines has been a persistent problem which has not been satisfactorily solved. In the preferred form of the invention, wherein matrix material is exclusively used, no free carbon fines are introduced in the system thereby greatly simplifying the filter operation.

A further important object of the present invention is to provide a system which produces the coal matrix as a product in itself, while simultaneously effecting the cleaning and purification of oil emulsions from oil refinery sewers or similarly from discharges from steel rolling mill operations, or other sources of oil contaminated effluents. This embodiment of the invention is useful where the carbon materials and the oil-contaminated effluent are readily available and the manufacturing of the matrix at that particular locale is of significant importance. If desired, the matrix thus formed can be completely withdrawn from the system, rather than being recycled, with the sorption material in this event consisting entirely of coal fines continually charged to the system. The term carbon materials as used herein is meant to specifically include waste products such as coal fines, fly ash, powdered carbon from oil shale processes, or finely powdered coal from any source. Although the term coal is referred to hereinbelow, carbonaceous material of any nature, including the other forms mentioned, can be used in accordance with the present invention for water purification. It should be noted that certain of these materials are presently pollutants in and of themselves, and the present invention thus reduces these pollutants to that extent.

Still another object of the invention is to provide a system in which the dosage of sorbent material can be closely controlled depending upon the amount of effluent and the amount of oil contaminants in such effluent. In this manner, with proper mixing, flocculation of the oil contaminants is essentially complete thereby to provide a clear, oil-free decant in the stratified zone thus developed, without at the same time having an excess of carbon fines which otherwise pose significant filtering and settlement problems, as above mentioned.

A further object of the present invention is to provide a method for the formation of a matrix material comprising finely divided carbon in a tractable form and a suitable plastic binder, which may comprise polyethylene, polypropylene, polyurethane or other available thermoplastic or thermosetting resins which effectively bind the carbon material to provide an open cell, porous material. Present indications and chemical theories are that such matrix material in the proper amounts and proper mixing is fully as effective as the well-known sorption materials such as activated carbon, activated charcoal or the like. Thus, the matrix material produced in accordance with the present invention is capable of satisfactorily treating algae growth, phosphates, toxic organic substances and many other known pollutants which are currently the target of ecologists and environmentalists. The primary advantages of the matrix material is its unusual and unforeseen sorption characteristics and the relative ease in which it can be regenerated for reuse, thereby distinguishing the same from activated carbon. In this regard, reference is made to the presently known uses of activated carbon for treatment of contaminated liquids as set forth in the article entitled "Use of Activated Carbon to Prevent Water Supply Contamination," appearing in Water and Wastes Engineering, vol. 6, pp. 42–44, February 1969.

These and other objects of the invention will become apparent when the description proceeds with particular reference to the application drawings.

BRIEF DESCRIPTION OF THE DRAWINGS

FIG. 1 comprises a diagrammatic illustration of one form of effluent treatment system in accordance with the present invention;

FIG. 2 is a diagrammatic illustration of part of the preferred form of the invention wherein only matrix material is employed; and FIG. 3 is a top plan, partially diagrammatic view of part of the system of FIG. 1.

DESCRIPTION OF THE PREFERRED EMBODIMENTS

The application drawings to which reference is now made diagrammatically illustrate a refinery effluent treatment system in accordance with the present invention. A hopper 10 is provided to which are delivered relatively fine coal particles by line 12 from the separator, and/or porous matrix material by line 68 from the stripper and matrix former to be hereinafter described. Oil refinery sewage is delivered to the hopper 10 by line 16. The carbon either in powdered or matrix form is preferably at least 200 mesh or smaller and, if coal, can be bituminous or sub-bituminous in grade. Other forms of carbon, such as fly ash and activated carbon can also be used.

Testing has indicated that where coal is used, the grade of the coal or the locale from which the coal originated has no significant effect on the sorbent qualities thereof. Therefore, for reasons of economy, the most available and inexpensive form of carbon is preferably used. The fineness of the coal is a significant consideration, and tests have indicated that the sorbent characteristics of the coal per unit weight decrease markedly as the coarseness of the coal increases. Since the sorbent qualities of the coal are substantially entirely based on the surface area of the coal, coal substantially finer than 200 mesh can be satisfactorily employed.

The effluent directed to the hopper 10 has been indicated as effluent from an oil refinery. The source of the effluent is illustrative only and it should be understood that effluent or sewage emanating from other types of treatment plants can likewise be handled by the present system. However, the present system is specifically designed to purify oil refinery effluent, and non-limiting reference will accordingly be confined thereto in the present specification.

In the FIG. 1 form of the invention, coal in powder form is delivered to the hopper 10 for sorbing the oil contained in the effluent. The matrix material is formed in the system from the powdered coal, and coal subsequently delivered to the hopper 10 comprises partially sorbed coal particles recycled for further passage through the system, as well as new coal added, or matrix added or recycled. As above mentioned, the matrix material formed in the system can if desired be completely withdrawn from the system, and coal fines continually added to the system at hopper 10. If a hybrid sorbent is employed, using both continually added coal fines and matrix material, the matrix can be recycled in the system from the matrix former, or new matrix can be added from matrix storage.

The coal and oil refinery sewage or effluent is gravity fed from the hopper 10 to a mixer 18 in which the coal and effluent are intimately mixed, with essentially complete sorption taking place upon effective contact. Any suitable mixer which can provide the desired intimate mixing can be employed, for example, the static mixing device illustrated in U.S. Pat. No. 3,286,992. Thus, the mixer 18 is formed with a series of longitudinally spaced curved elements commonly designated at 20 which effect continuous splitting of the feed material and thereby intimate mixing thereof. A stirring paddle 21 is mounted for rotation in the hopper 10 for initial mixing of the effluent and powdered coal or matrix.

The discharge end of the mixer 18 communicates with a sedimentation tank 22 inside of which are mounted a plurality of spaced baffles commonly designated at 24. As can be seen in FIG. 3, alternate baffles are secured to one side of the sedimentation tank, with the remaining alternate baffles being secured to the opposite side of the sedimentation tank. The free ends of the baffles terminate at spaced intervals from the adjacent tank wall whereby the baffles collectively define a labyrinth passage through the tank to provide uniform horizontal movement of all liquid in the tank. The sole function of the baffles is to prevent short-circuit flow through the tank, thereby maximizing the settlement of heavier-than-coal particles such as rock and unwanted mineral particles.

In the form shown, the sedimentation tank 22 is generally circular in transverse cross-section and is formed with a sloping bottom wall 26 which terminates in a discharge outlet 28. A pair of scraper arms commonly designated at 30 are disposed in the sedimentation tank relatively adjacent the sloping bottom wall thereof, and are secured to and rotated by drive shaft 32 which is in turn drivingly connected to motor 34 mounted in any suitable manner above the sedimentation tank. The scraper arms 30 function to enhance withdrawal of settled material from the tank bottom through the outlet 28.

In the sedimentation tank 22 the heavy materials will gravitate to the bottom thereof and will be discharged through the outlet 28. A pump (not shown) can be provided in the discharge line to pump the discharge material either to a reject area, hopper 10, a matrix slurry tank, or directly to the matrix former, if the quality of the discharge is sufficiently high to permit recycling in the system. These alternatives are shown in dashed lines in FIG. 1. The material discharged comprises essentially heavier materials contained either in the effluent or the original coal charge, or materials which might accidentally enter the system, with the withdrawal of these heavier undesirable particles effectively purifying the sorption material.

The sorption of the oil by the sorption material is essentially completed in the static mixer 18, and the oil-laden sorption material, being a float product, is discharged from the sedimentation tank through the discharge overflow pipe 35 disposed relatively adjacent the top of the tank generally diametrically opposite the tank inlet at the discharge end of the static mixer 18. The oil-sorbed coal particles float due to the upward movement of the material in the sedimentation tank with reduced effective weight of the coal, due to the oil sorbed, with air circulating in the tank enhancing the upward movement of the sorbed coal particles. In this sense, the selective upward movement of the sorbed coal somewhat resembles a flotation process.

In order to further enhance the floating of the sorbed coal particles, a compressed air line 35a is preferably provided communicating with the interior of the tank 22. The oil-laden coal fines flow from the tank 22 through line 35.

The concentrate flows from the sedimentation tank 22 through line 35 to a separator tank 36 also provided with a series of space baffles commonly designated at 38. The baffles 38, like baffles 24 in the sedimentation tank, are alternately securely mounted to opposed side walls of the separator, as seen in FIG. 3, thereby to provide a labyrinth passage therethrough. Scraper arms 40 are located adjacent the sloped bottom wall 42 of the separator and are driven by shaft 44 and motor 46. The shaft 44 also has mounted thereon a skimmer arm 48 which rotates in a plane generally at the top of the separator for the purpose of skimming from the top surface of the liquid the oil-laden sorbent, which tends to float, as above described. The sorbent is discharged through line 49 and can be pumped, as shown in dashed lines, either to the matrix slurry tank or directly to the matrix former depending on process conditions in the system. A dewatering auger 50 of conventional construction is preferably provided in the line directly to the matrix former, in order to reduce the water content of the sorbent thereby reducing the load on the matrix former. The less rich sorbent tends to sink to the bottom of the separator tank 36 for removal therefrom. As an alternative treatment, the oil-laden matrix can be removed from the system for gravity drainage of oil excess prior to stripping, as described in my pending application Ser. No. 121,000.

A bottom discharge outlet 51 is provided at the bottom of the separator 36 for removing the less rich sorbent material from the separator. This material may be recycled by pump 60 to the hopper 10, the slurry tank 70, or conveyed directly to the matrix former 64. If directed to the latter, a dewatering auger 52 is preferably placed in the line to reduce the water content of the material.

It has been found that the sorption material sorbs substantially all the oil impurities including oil emulsions, the treatment of which has plagued the industry for years, as above noted. By properly controlling the system through the provision of predetermined quantities of coal, based on the estimated or known amounts of oil contamination in the effluent, and the proper mixing of the oil with the coal to assure intimate contact of all of the oil with the coal, substantially all of the oil can be removed from the effluent. It will be understood that the contact of the oil with the coal in the mixer is essentially a statistical matter, with sufficient coal being present in the system to assure a high probability that all of the oil present, in any form, is sorbed by the coal.

Of particular importance to the present invention is the relatively rapid sorption of the oil, whether it be in the form of free oil, emulsified oil or dissolved oil by-products. In actual testing, essentially all of the oil is contacted with and sorbed by the coal in approximately one minute or less, provided the correct ratio of coal and oil is present, as above explained, thereby greatly increasing the capacity of the system due to the more rapid circulation permitted due to the sorption rates. The high capacity provided by the system is of course of considerable commercial importance, and permits treatment of comparable quantities of effluent with substantially less expensive and space consuming equipment.

With regard to the actual working ratios of coal and oil, these will vary depending upon the size of the coal particles and the physical and chemical characteristics of the oil. Tests have shown that with respect to No. 2 fuel oil, for example, and $-200$ mesh sub-bituminous and bituminous coal as a powder, the actual oil sorbed to coal weight ratio is about one-third, under static filtering conditions.

With respect to oil emulsions, tests have shown that 30 grams or less of —200 mesh bituminous or sub-bituminous powdered coal in a liter of water contaminated with a refinery sewer emulsion containing 20 p.p.m. organics will, upon agitation, effectively sorb all of the oil and provide an essentially clear liquid zone following cessation of the agitation. A coal-oil flocculent is formed which then acts to aid the decant and/or the filtering of the treated effluent.

The retention time of the oil-laden sorption material in the separator 36 will depend upon the size of the separator and the quantity of material conveyed thereto from the sedimentation tank 22. The retention time in any event must be sufficient to effect the creation of the clear effluent mid-zone. Tests indicate that such clear mid-zone is created in several hours, as contrasted with days in sedimentation tanks or lagoons which form part of present sewage treatment systems. If reduced retention times are desired, suitable filtering equipment could be employed of the type to be presently described in connection with the preferred, FIG. 2 embodiment. In such event, the system would comprise a hybrid of both powdered coal and matrix as the sorbent material.

It has also been found that in the separator tank 36, a relatively clear zone of liquid is formed intermediate the top layer of scum and the bottom region of settled, less rich sorption material. This relatively clear decant is withdrawn from the separator tank through a filter screen 52 formed with decant outlet 53 in the vertically intermediate portion thereof, with the clear liquid passing outwardly through a discharge housing 54 mounted at the side of the separator. The housing 54 communciates with a decant discharge line 56 for removal of the decant for subsequent treatment, if desired.

The stripper and matrix former 64 is preferably of conventional construction and functions to strip the oil from the sorbent material by using steam in vaporizing the oil thereby permitting subsequent condensation and recovery of the oil, and conditioning the sorbent material for matrix formation. The stripper 64 also functions in accordance with the invention to form therein sorbent matrix material, as will be presently described.

The stripper 64 is shown schematically and preferably comprises a twin pug mill including a series of axially spaced stirring or mixing beaters 66 on twin parallel shafts which turn in opposite directions and which continually mix the material in the stripper and advance the same toward the discharge opening 68. The heat for vaporizing or stripping the oil from the sorbent material is preferably supplied by steam which is directed both to the interior of the stripper 64 and also to steam jackets surrounding the same to enhance the heat retention characteristics of the stripper.

Although the stripper 46 in the form shown comprises a pug mill, other conventional and well-known devices are applicable and useful for the same purpose. Representative of such other devices are rotating drums, rotating moulds, cascading beds, fluidized beds, balling discs, static mixers, static mixers in combination with a rotating drum, or any other combination of devices to produce steam stripping followed by a sintering and balling action so that a coherent, porous, coal-plastic matrix is formed and comminuted into discrete masses of optimum size.

As above indicated, the stripper 64 functions not only to strip oil from the sorbent material but also as a former or reformer of the porous matrix material, in the event that matrix material is desired to be added to the recycled coal powder. Thus "rich" powdered coal is delivered to the stripper for stripping therefrom the oil, thereby providing "lean" coal powder for recycling to the hopper 10. The stripper 64 functions as a matrix former when powdered coal and polyethylene in intimately mixed dry or slurry form is delivered to the stripper for matrix formation.

In the FIG. 1 form of the invention, the coal and polyethylene (PE) are preferably delivered to the matrix former in slurry form, with the slurry being formed in a slurry mixer generally indicated at 70. The amount of PE and additional carbon fines added to the system by means of the slurry tank will depend upon operating conditions in the system and the amount of coal cycled to the slurry mixer.

To form the slurry, powdered PE is added to the slurry mixer 70 through line 72, additional powdered coal through line 74, and water or other suitable liquids, through line 76. These materials are mixed in the slurry mixer by means of a mixing blade 78 driven by a suitable drive motor (not shown), and are pumped in slurry form from the mixer 70 by pump 80 to line 81 leading into the stripper 64. If desired, a dewatering auger 82 can be located in line 82 to reduce the water content of the slurry before entry into the matrix former 64. A static mixer can also be employed in lieu of or in addition to the slurry mix tank 70. For example, dry PE powder could be added by means of a static mixer to the coal slurry after the same has been formed in the slurry tank, thereby using the tank only for formation of the coal slurry.

In the stripper and matrix former 64, the coal and PE are heated to 180°–200° C. at which temperature the PE melts and serves to adhesively bind the carbon particles in rigid, spaced relation thereby to form an open celled, porous matrix material. In this manner, the powdered coal, which is otherwise essentially intractable, becomes tractable and as a result, a superior sorptive material is provided having a high affinity for oil in the presence of both oil and water. After the matrix is formed, the temperature in the stripper is reduced thereby allowing the matrix material to set.

The sorbent matrix material formed in the matrix former 64 is discharged therefrom through line 68 for addition to the hopper 10. Although not shown, it is preferred that the discharge line be suitably valved so as to maintain the pressure within the stripper 64. It is due to the steam within the stripper 64 that even heavy oils can be vaporized at the relatively low temperatures of 180°–200° C. or less, especially when sub-atmospheric pressures prevail. At such temperatures and pressures, the water present in the slurry directed to the stripper will also be vaporized, with both the oil and water vapors passing from the stripper through the vapor discharge outlet 90.

The vapors are passed to a vapor condenser 92 wherein the oil and water are condensed for subsequent passage by line 94 to a liquid separator 96. Due to the differences in specific gravity of the oil and water, the oil accumulates in the top of the separator and is withdrawn therefrom by pump 98, with the water accumulating by gravity in the bottom of the separator being withdrawn therefrom by pump 100 for passage to a boiler or other suitable further treatment.

A portion of the vapors emanating from the stripper through discharge outlet 90 may be recycled by blower 102 and line 104 to the inlet side of the stripper 64 thereby serving to increase the oil/steam ratio of the vapors passing to the condenser and effectively reduce the quantity of condensed steam necesary to carry over the oil produced and recovered by the system.

It will thus be seen that in the invention thus far described, a system is provided for separating the oil from the effluent liquid. The system is operative through a charging of powdered coal, with the stripper 64 functioning to strip the oil from the powdered coal and to form matrix material from the slurry delivered thereto from the matrix slurry mixer 70. As the operation is continued, the powdered coal originally charged to the system is eventually converted into matrix material for recycling to the hopper 10 or for use in places and for purposes remote from the disclosed environment. The system can thus be considered to importantly include a method of forming matrix material comprising carbonaceous material and plastic material, preferably PE or polypropylene, in addition to the normal function of the stripper to strip the oil from the rich matrix material. The coal, whether in powdered or matrix form, is highly oil-avid, and selectively sorbs the oil whether the oil is present in a free state, as an oil/water mixture, as an emulsion, or in, as some authorities now believe, dissolved form. The purified effluent withdrawn from the separator 36 through discharge opening 53 is essentially oil free.

Where powdered coal comprises the original charge, the system is monitored and controlled to determine the quantity of further coal powder or matrix addition. Further coal can be added to the system either at the hopper 10 or at the matrix slurry mixer 70, if the formation of matrix material appears to be more desirable than addition of futher coal in powdered form to the system.

Reference is now made to FIG. 2 which shows in fragmentary, side elevation the preferred form of the invention wherein generally matrix material exclusively as a recycle is employed. Those parts which have been previously illustrated in FIG. 1 and which appear in FIG. 2 are indicated by the same reference numeral with an attached prime.

Although not shown for reasons of simplicity, the FIG. 2 system also comprises a hopper similar to hopper 10 to which refinery effluent and stripped matrix material are directed. A mixer similar to mixer 18 is employed for intimately mixing the charged materials prior to passage to a sedimentation tank which can be of like construction to the sedimentation tank 22 above described and illustrated in FIG. 1.

The separator 36' is similarly provided with a series of spaced baffles 38', only one of which is visible in FIG. 2, which are alternately secured to the opposed sides of the separator tank to provide labyrinth passage through the separator to enhance the mixing and contacting of the matrix material with the effluent. A scraper arm is employed to scrape the bottom of the separator thereby to facilitate discharge of the rich matrix material in the manner above described. A top skimmer arm is likewise provided for discharging rich matrix material and other floats through an outlet (not shown) similar to outlet 49 for delivery to the stripper 64 preferably through a dewatering screw, or to the slurry mixer tank 70, as desired.

As in the first described embodiment, a relatively clear, non-contaminated decant is generally formed in the intermediate region of the separator, although not vital to this embodiment of the invention, and the effluent is discharged through clear effluent line 112 for further treatment as may be desired. As above mentioned, the clear effluent is substantially oil-free, having much less than 15 p.p.m., thereby permitting the effluent to be discharged directly into surface waterways or sewer systems.

Positioned adjacent one side of the separator 36' is a moving filter screen 120 the upper and lower ends of which are trained around sprockets or rollers 122 and 124, respectively.

One or both sprockets can be driven to rotate the filter screen in the direction indicated by arrows in FIG. 2. The screen 120 functions to filter the effluent before passage to the clear effluent line 112. In this regard, there is a buildup of matrix material on the screen, with the matrix material itself serving as a filter medium. The coal fines contacting the matrix tend to agglomerate therewith, thereby reducing the filtering load on the screen itself. This substantially reduces the filtering problem that has for years plagued the users of powdered carbon in previously known treatment systems of general type.

A water jet 126 is disposed adjacent the bottom of the filter and directs the stream there against and/or through the filer screen for purposes of cleaning the filter. The jet is supplied by pump 128 which communicates with the housing 130 disposed at the side of the separator and which houses the screen filter 120. The sorbent materials which pass the matrix material and collect on the filter 120 are removed therefrom by the jet 126 will eventually move upwardly for removal from or recycling in the system, with any matrix material gravitating to the bottom of the separator being discharged through outlet 51' for recycling in the system, as previously described, and the sorbent material which floats is removed from the top of the separator for stipping or recycling as desired.

It will be understood that other known filtering means could alternatively be provided for the purpose of filtering out the sorbent material from the clear effluent.

The system employing exclusively matrix material is essentially the same in the stripping or matrix forming parts of the system, and that portion of FIG. 1 has accordingly not been duplicated in FIG. 2. Although the integrity of the matrix material is such that there is very little matrix lost in the recycling process, make-up matrix is supplied as needed by the matrix slurry mixer 70, or can be supplied in mixed, powdered form directly to the matrix former 64. In this regard it is not required that the powdered PE and coal fines be slurried before matrix formation. Tests have shown that the powdered coal and PE can be conveyed, premixed, and introduced directly to the matrix former, either as a separate mix or in conjunction with an already formed matrix, which itself may be either wet or dry and either "lean" or "rich," with the sintering temperatures in the range disclosed above melting the PE and effectively binding the coal particles by the powdered and new adhesive PE to form the porous matrix, or, concomitantly, to strip and/or reform an already formed "lean" or "rich" matrix.

It is noted further that several well-known thermoplastic and thermoset plastic materials have been tested. A static mixer or other conventional equipment is effective in injecting powdered coal intimately intermixed with dry powdered plastic in the case of thermoplastic materials, or powdered and liquid thermoset plastic ingredients, either with or without a fixing agent, directly into the stripper former/reformer. The choice of any single plastic as a binder/adhesive for the coal in forming the porous matrix will dictate the particular equipment choice for former/reformer.

Controlled monitoring of the system can readily detect any inbalance in the system and matrix can be added as needed to achieve optimum sorption of the oil in the effluent.

Where matrix exclusively is used, the rich matrix material is stripped and the lean matrix recycled back to hopper 10. The vaporized oil is taken off the stripper at line 90 for subsequent condensation, as previously described.

It should be noted that the matrix formed in the stripper may be removed from the system for use elsewhere rather than recycled. Thus, the system is seen to have matrix-forming capabilities, apart from or in addition to its designed capabilities of oil removal in the closed system.

It was previously mentioned that a hybrid system using both powdered coal and coal matrix will serve to reduce the system retention time. A reduced retention time for a given through-put means a smaller system fluid holding volume which always lowers the construction cost of this general class of apparatus. The required retention time is the sequential sum of the time required for adequate mixing to achieve an intimate contact of all of the oil with lean coal, the time required for the flocculation of the coal so that it can be separated from the purified effluent, and the time required for differential stratification of the flocculent to permit decanting, on the one hand, or filtering as an alternative approach. The hybrid system is useful in making use of the great number of individual particles of a powder to increase the likelihood of improving the contact time over the matrix system which uses all matrix as a recycle. The hybrid system improves the decant time required by the powder system since no decant time is required and the purified effluent is separated from the sorbent by filtering, as shown in FIG. 2, and thus the best features of the powder embodiment and the matrix embodiment are part of the hybrid system when suitable raw materials are economically available and the "dirty water" is oil-containing.

In this embodiment of the invention, both lean coal matrix and len powdered coal are recycled in the system, directly to the slurry tank 70. The material is eventually directed to the stripper and matrix former 64, through dewatering auger 82, for stripping the oil-containing sorbent material and forming and/or reforming the matrix material. Any excess matrix can be removed from the system as one of the system products. Additional powdered coal can be added as needed depending upon the powder-matrix ratio recycled to the hopper 10.

An experiment which illustrates the reduced retention time of the hybrid system will be described:

A dosage of 3 grams per 200 ml. of −200 mesh sub-bituminous coal was added to refinery sewage effluent containing emulsified oil in the amount of 15–30 p.p.m. To this was added 3 grams/200 ml. of 4/10 mesh coal matrix, prepared from polyethylene and −200 mesh sub-bituminous coal. The mixture was shaken vigorously 10 minutes, followed by gravity filtration in a conventional manner and without vacuum. The filtrate was substantially purified and without oil odor. There were no difficulties in the gravity filtration of the sorbent material from the liquid. The filter cake was loose and the coal powder did not separate and from a tight hard cake on the filter paper. The filter cake was readily washed from the filter paper. It was apparent that the powdered coal agglomerated substantially with the coal matrix. It was also apparent that the coal powder facilitated the intimate intermixing of coal and the emulsified oil, and that the coal matrix facilitated the filtration of the enriched coal powder as well as assisting the sorption process.

This particular water contained 20 p.p.m. total organics as an emulsion consisting of a mixture of highly oxygenated aliphatic and aromatic hydrocarbon compounds. The oxygenated compounds were both carboxylic acid and ester types. It was likely from the spectrum that a complexity of individual molecules made up the organic portion, not just one or two or three individuals.

Atfer treatment with the combined coal powder and coal matrix as described above, the original 20 p.p.m. total organics had been reduced to 3 p.p.m. The organic material consisted of highly oxygenated aliphatic hydrocarbons without the apparent presence of any aromatics which were present in the untreated sample. Also the location of the carbonyl absorption band near 5.78 microns indicates that the oxygenated material was mostly esters rather than a mixture of esters and acids as was the case for the untreated sample. The absence of bands near 3.3, 6.23, and 6.65 microns in the treated sample and their presence in the untreated sample indicate the total sorption of the aromatic hydrocarbons. There is strong evidence that the organic acids also were sorbed.

As a control standard to illustrate the inadequacy of conventional material, a similar laboratory procedure was followed using activated carbon (4/10 mesh) and a second aliquot of the same refinery effluent containing 15–30 p.p.m. oil of the same intractable emulsion which had passed through the usual A.P.I mechanical separation. Similar to the example above, a dosage of 6 grams per 200 ml. of a commercial activated carbon (4/10 mesh) was added to the 200 ml. of the refinery sewage effluent. The mixture was shaken vigorously for ten minutes, followed by an attempted gravity filtration as described above. It was found that 53 ml. of the original 200 ml. failed to pass through the filter funnel in 30 minutes as compared to complete filtration in 5 minutes in the example above. Except for the capture of the minor amounts of free oil (present as a film on the filter paper), there was no visible apparent change in the emulsion as a result of treatment with 30 grams per liter of 4/10 mesh activated carbon at 10 minutes contact time.

It is therefore apparent that the great absorption surface characteristic of activated carbon is negated in this oil emulsion at least, by the inability of the oil to penetrate and selectively wet the interior pores of the 4/10 mesh pieces of carbon.

It is thus apparent that equal weights of coal and coal matrix and activated carbon in easily filterable sizes, differ greatly in sorption efficiency. The finely powdered coal and coal matrix which form the hybrid recycle are vastly more effective than an equal weight of 4/10 mesh activated carbon. It is recognized that if the activated carbon were in a finely powdered condition, and were to be used in the hybrid recycle, it would be more effective than coal powder alone. However, both powdered coal and activated carbon are very difficult to filter economically. The present system overcomes this difficulty irrespective of the form of carbon used in the process. The foregoing experiment is presented to show that activated carbon in itself is not apparently a single satisfactory engineering solution to the problem inherent in oil-containing effluents.

It should be noted that the specific gravity or bulk density of the porous matrix material will vary depending upon the coal/PE ratio and the coarseness of the coal. Generally speaking, the greater the percentage of coal in the matrix, the greater the specific gravity. Similarly, the coarser the coal, the greater the specific gravity. The type of plastic binder employed also affects the specific gravity of the resulting matrix material. Thus, depending upon the type and size of the constituents comprising the matrix material, which can be fairly closely controlled, certain matrix materials may be lighter, and thus more readily floatable than others. Thus, although it is desirable to be able to float substantially all of the matrix material, certain amounts of such material may tend to gradually sink in the effluent, which amounts can be withdrawn from the bottom of the tanks 22 and 36 for recycling and/or removal from the system.

I claim:

1. The method of separating oil and other organic contaminants from an effluent containing such contaminants comprising the steps of:
   (a) intimately mixing finely divided carbonaceous material selected from the group consisting of finely divided coal, fly ash, powdered carbon from shale oil processes, activated carbon, and activated charcoal, and having a size range of −200 mesh or finer with the effluent desired to be purified to form a slurry, said carbonaceous material during such intimate mixing sorbing substantially all of the oil or organic contaminants in the effluent,
   (b) stratifying said intimately mixed slurry to form a bottom layer comprised of materials relatively heavier than the specific gravity of said effluent, a top float layer comprised essentially of oil-sorbed carbonaceous material, and a relatively clear midzone of substantially contaminant free effluent,
   (c) intimately mixing said oil-enriched carbonaceous material with a powdered plastic material selected from the group consisting essentially of polyethylene and polypropylene,
   (d) heating the mixture of said oil-enriched carbonaceous material and said powdered plastic material to temperatures sufficiently high to vaporize and thus strip the sorbed oil from said carbonaceous material, the plastic material at such temperature being softened to adhesively bind the carbonaceous material in relatively spaced relation thereby to form a porous lightweight matrix material which has a high affinity for oil, is combustible, and sufficiently light to float on water, and
   (e) recycling at least a portion of the thus formed matrix material to the effluent mixing station for intimately mixing such matrix material with successive charges of effluent.

2. The method of claim 1 further including the step of condensing the oil vapors thus formed to provide oil in liquid form which can be controllably handled for disposal as desired.

3. The method of claim 1 further including the step of dewatering said mixture of oil-enriched carbonaceous material and said plastic material prior to heating the same to vaporize the sorbed oil from said carbonaceous material.

4. The method of claim 1 wherein additional finely divided carbonaceous material is added to the recycled matrix material at the effluent mixing station, thereby providing a sorbent material comprised of both matrix and finely divided carbonaceous material.

5. The method of claim 1 further including the step of withdrawing from the system at least a portion of the matrix material thus formed for use independent of the system.

6. The method of claim 1 wherein said stratification is accomplished in the presence of compressed air thereby facilitating the flotation of the oil-sorbed carbonaceous material to the top surface of the liquid to enhance removal thereof.

7. The method of claim 1 wherein said stratification is performed in stages, the first stage comprising the passage of the slurry through a labyrinth passage in a sedimentation tank to facilitate gravity separation of the relatively heavier particles, with the relatively lighter material in the sedimentation tank being directed to a separator tank in which the float layer comprises essentially oil-sorbed carbonaceous material and wherein a relatively clear mid-zone of substantially contaminant-free effluent is formed in the separator which can be removed and disposed of without further treatment.

8. The method of claim 1 wherein at least a portion of the vapors produced in the stripping and matrix forming process are recycled back to the matrix formed to improve the heat exchange characteristics of the system.

9. The method of claim 1 wherein said relatively clear mid-zone of substantially contaminant free effluent is filtered before passage from the stratification apparatus, with the filter medium comprising a vertically movable filter screen on which is accumulated a layer of matrix material, said matrix material in itself functioning as a filter material and serving to agglomerate and sorb any relatively free carbonaceous material contained in the contaminant-free effluent mid-zone.

10. The method of separating oil and other organic contaminants from an effluent containing such contaminants comprising the steps of:
  (a) intimately mixing powdered polyethylene and finely divided carbonaceous material selected from the group consisting of finely divided coal, fly ash, powdered carbon from shale oil processes, activated carbon, and activated charcoal, and having a size range of —200 mesh or finer,
  (b) heating said mixture to soften said polyethylene to adhesively bind the carbonaceous material thereto in relatively spaced relation thereby to form a porous lightweight matrix material,
  (c) intimately mixing the thus formed matrix material with the effluent desired to be purified to form a slurry, said matrix material during such intimate mixing sorbing substantially all of the oil or organic contaminants in the effluent,
  (d) stratifying said intimately mixed slurry to form a top float layer comprised essentially of oil-sorbed matrix material and a relatively clear mid-zone of substantially contaminant-free effluent,
  (e) heating said oil-enriched matrix material to temperatures sufficiently high to vaporize and thus strip the sorbed oil from said matrix material,
  (f) condensing the oil vapors to provide oil in liquid form which can be controllably handled for disposal as desired, and
  (g) recycling at least a portion of the stripped matrix material back to the mixing station for intimate mixing with successive charges of effluent.

11. The method of claim 10 further comprising the steps of conveying said top float layer of oil-sorbed matrix material to a slurry mix tank prior to heating said matrix material, adding to said slurry mix tank additional amounts of —200 mesh or finer finely divided carbonaceous material and powdered polyethylene; intimately mixing the matrix to be stripped, the powdered carbonaceous material and the polyethylene in said slurry tank before passing to said heating zone, the subsequent heating of said slurry material serving to vaporize the oil from the oil-sorbed matrix material thereby reforming such matrix material, and to form new matrix material as the polyethylene softens at the heating temperatures to adhesively bind the separate carbonaceous particles.

12. The method of claim 10 including the step of withdrawing at least a portion of the thus formed matrix material from the system for use independent of the system.

References Cited

UNITED STATES PATENTS

| | | | |
|---|---|---|---|
| 3,215,623 | 11/1965 | Hix | 210—24 |
| 3,674,684 | 7/1972 | Gollan | 210—40 X |
| 2,464,204 | 3/1949 | Baker | 210—36 |
| 3,244,621 | 4/1966 | Bouthilet | 210—40 |

FOREIGN PATENTS

| | | | |
|---|---|---|---|
| 919,780 | 2/1963 | Great Britain | 210—Dig. 21 |

SAMIH N. ZAHARNA, Primary Examiner

T. G. WYSE, Assistant Examiner

U.S. Cl. X.R.

210—40, Dig. 21